United States Patent [19]

Snitzer

[11] Patent Number: 5,574,807
[45] Date of Patent: Nov. 12, 1996

[54] COUPLER USED TO FABRICATE ADD-DROP DEVICES, DISPERSION COMPENSATORS, AMPLIFIERS, OSCILLATORS, SUPERLUMINESCENT DEVICES, AND COMMUNICATIONS SYSTEMS

[75] Inventor: Elias Snitzer, Piscataway, N.J.

[73] Assignee: Rutgers University, Piscataway, N.J.

[21] Appl. No.: 469,196

[22] Filed: Jun. 6, 1995

Related U.S. Application Data

[60] Division of Ser. No. 185,071, Jan. 19, 1994, Pat. No. 5,459,801, which is a continuation-in-part of Ser. No. 145,390, Oct. 29, 1993, Pat. No. 5,457,758.

[51] Int. Cl.$^6$ .............................. G02B 6/26; G02B 6/42
[52] U.S. Cl. ............................................ 385/24; 359/572
[58] Field of Search .................................. 385/24, 30, 37; 372/1, 18, 20, 50, 44, 46, 92, 6; 359/572

[56] References Cited

U.S. PATENT DOCUMENTS

| 5,210,404 | 5/1993 | Cush et al. | 385/37 |
| 5,324,933 | 6/1994 | Berkcan | 385/12 |
| 5,392,308 | 2/1995 | Welch et al. | 372/92 |
| 5,457,758 | 10/1995 | Snitzer | 385/30 |
| 5,459,801 | 10/1995 | Snitzer | 385/30 |
| 5,492,611 | 3/1996 | Welch et al. | 372/50 |

OTHER PUBLICATIONS

All-Fibre Narrowband Reflection Gratings at 1500 nm, R. Kashyap et al., Electronics Lett. vol. 26, May 24, 1990, pp. 730–731.

Formation of Bragg gratings in optical fibers by a transverse holographic method, G. Meltz et al., Optics Lett. vol. 14, Aug. 1, 1989, pp. 823–825.

Intermodal Coupler Using Permanently Photoinduced Grating in Two–Mode Optical Fibre, H. G. Park et al., Electronics Lett., vol. 25, Jun. 8, 1989, pp. 797–798.

Narrow–Bandwidth Optical Waveguide Transmission Filters, K. D. Hill et al.; Electronics Lett., vol. 23, Apr. 23, 1987, pp. 465–466.

Guided normal wides of two parallel circular dielectric rods, W. Wijngaard, J. Opt. Soc. Amer., vol. 63, No. 8, Aug. 1973, pp. 944–950.

Cross–talk fiber–optic temperature sensor, G. Meltz et al., Appl. Optics, vol. 22, Feb. 1, 1983, pp. 464–477.

Magnification of Mask Fabricated Fibre Bragg Gratings by J. D. Prohaska et al., Electronics Lett., vol. 29, No. 18, Sep. 2, 1993, pp. 1614–1615.

*Primary Examiner*—Akm E. Ullah
*Attorney, Agent, or Firm*—Mathews, Woodbridge & Collins

[57] ABSTRACT

Device for use in adding or dropping light signals at predetermined center wavelengths to or from a wavelength division multiplex, fiber optic transmission system. The device includes an evanescent wave coupler having a coupling region formed from two single mode waveguides, the coupling region being formed so that there is substantially complete evanescent field coupling of light from one waveguide to the other in a predetermined wavelength band. Further, the device has a Bragg grating disposed in the coupling region in each of the waveguides.

4 Claims, 9 Drawing Sheets

COUPLER USED TO FABRICATE ADD-DROP DEVICES, DISPERSION COMPENSATORS, AMPLIFIERS, OSCILLATORS, SUPERLUMINESCENT DEVICES, AND COMMUNICATIONS SYSTEMS

This application is a division of application Ser. No. 08/185,071, filed Jan. 19, 1994 U.S. Pat. No. 5,459,801, which is a continuation-in-part of a patent application having Ser. No. 08/145,390 which was filed Oct. 29, 1993, now U.S. Pat. No. 5,457,758.

TECHNICAL FIELD OF THE INVENTION

The present invention relates to coupler devices for use in fabricating: (a) add-drop devices for use in adding or dropping light signals at predetermined center wavelengths to or from a wavelength division multiplex, fiber optic transmission system; (b) dispersion compensators; (c) amplifiers; (c) oscillators; (d) superluminescent devices; and (e) communications systems.

BACKGROUND OF THE INVENTION

The development of Bragg grating reflectors within single mode fibers that are stable and highly selective in wavelength and the demonstration that erbium doped fiber amplifiers (EDFA) are capable of broadband amplification of signals at different, closely space wavelengths, has caused those in the art to consider fabricating a wavelength division multiplex, fiber optic transmission system. However, in order to fabricate such a transmission system, it becomes readily apparent that there is a need for a device for use in adding or dropping a light signal at a predetermined center wavelength to or from such a fiber optic transmission system without disturbing other signals at other wavelengths.

The following describes various devices in the prior art which are candidates for use in fabricating the required add/drop device. A publication entitled "All-Fibre Narrowband Reflection Gratings at 1500 nm" by R. Kashyap, J. R. Armitage, R. Wyatt, S. T. Davey, and D. L. Williams, published in *Electronics Lett.*, vol. 26, 1990, pp. 730–732, discloses a 50%×50%, 2 by 2 fiber coupler which is used to couple signal input at all wavelengths and to extract Bragg reflected light. The device and its method of use are disadvantageous in that there is a loss of at least 75% of the reflected light intensity.

A publication entitled "Formation of Bragg gratings in optical fibers by a transverse holographic method" by G. Meltz, W. W. Morey, and W. H. Glenn, published in *Optics Lett.*, vol. 14, 1989, pp. 823–825, discloses the use of a beam splitter to couple broadband light to a Bragg grating. The device and its method of use are disadvantageous in that the beam splitter attenuates both transmitted light and, even more so, reflected light.

A publication entitled "Intermodal coupler using permanently photoinduced grating in two-mode optical fibre" by H. G. Park and B. Y. Kim, published in *Electronics Lett.*, vol. 25, 1989, pp. 1590–1591, discloses a device in which mode coupler gratings are formed by photorefraction in slightly multimode elliptical fibers. The device is disadvantageous in that the grating periodicity is very large and, as a result, the device is not suitable for use in fabricating efficient wavelength division multiplex components.

A publication entitled "Narrow-Bandwidth Optical Waveguide Transmission Filters" by K. D. Hill, D. C. Johnson, F. Bilodeau, and S. Faucher, published in *Electronics Lett.*, vol. 23, 1987, pp. 465–466, discloses a Sagnac loop reflector device which consists of: (a) a twin core fiber at the input and output of the loop and (b) a Bragg grating in the loop which is used to isolate a narrow band of wavelengths. This device and its method of use are disadvantageous in that a beam splitter or coupler is required to transmit the other wavelengths and this causes light loss. Also, for proper functioning, optic path lengths in the loop have to be controlled to fractions of a wavelength and this is difficult to achieve.

In light of the above, there is a need in the art for a device for use in adding or dropping light signals at predetermined center wavelengths to or from a wavelength division multiplex, fiber optic transmission system which carries signals at other wavelengths, which device overcomes the above-described disadvantages. Further, there is a need for such a device for use in adding or dropping a light signal with minimum loss to the light signal being added or dropped and to light signals at other wavelengths already on the transmission system. Still further, there is a need for such a device for use in adding or dropping which can add or drop a predetermined fraction of the light signal. Yet still further, there is a need in the art for such a device for use in adding or dropping wherein the center wavelength of the light signal which is added or dropped is tunable.

In addition to the above, it is well known in the art that dispersion arises in an optical fiber communication system as a result of a change in group index of refraction over a wavelength interval which contains information carried on an optical fiber line which comprises the optical fiber communication system. For example, the zero dispersion wavelength for silica based fibers is approximately 1.3 microns. Thus, for radiation in a band of wavelengths shorter than 1.3 microns, the long wavelength radiation in the band arrives at the end of a length of fiber sooner than radiation at the short wavelengths in the band. Similarly, for silica based fibers, for wavelengths longer than 1.3 microns, radiation at the shorter wavelengths in the interval of wavelengths carrying the information arrive sooner than radiation at the longer wavelengths. Thus, dispersion compensation is required to transmit a signal with high fidelity if the carrier wavelength is other than approximately 1.3 microns. In particular, dispersion compensation is required for optimum transmission if radiation at 1.5 microns is used with silica fibers to take advantage of the use of, for example, erbium doped fiber amplifiers operating substantially at this wavelength.

It is well known in the art that chirped gratings can be used to provide such dispersion compensation. However, prior art investigations into the use of chirped gratings entail fabricating a system wherein output from a single mode core fiber is fed to a chirped grating through a 2 by 2, biconical, tapered coupler. Then, the output from the chirped grating is fed back through the 2 by 2 coupler to an output port of the coupler. One result of this system configuration is a minimum loss of 6 dB in radiation output therefrom due to the radiation passing through the coupler twice.

In light of the above, there is a need in the art for a device for use in providing dispersion compensation without large loss.

SUMMARY OF THE INVENTION

Advantageously, embodiments of the present invention satisfy the above-identified first need in the art and provide a device for use in adding or dropping light signals at predetermined center wavelengths to or from a wavelength division multiplex, fiber optic transmission system which carries signals at other wavelengths. Further, embodiments of the present invention provide an add/drop device for use in adding or dropping the light signal with minimum loss to the light signal being added or dropped and to light signals at other wavelengths already on the transmission system. Still further, alternate embodiments of the present invention provide an add/drop device for use in adding or dropping which can add or drop a predetermined fraction of the light signal. Yet still further, further embodiments of the present invention provide an add/drop device for use in adding or dropping wherein the center wavelength of the light signal which is added or dropped is tunable.

An embodiment of the present invention is a four port device for use in a transmission system having multiple channels, for example, T channels, wherein each channel is carried at a different wavelength. The inventive add/drop device may be utilized to drop channel n at, for example, wavelength $\lambda_n$, by coupling all the signals on a single mode fiber transmission line into port one of the device. Then, in accordance with the present invention, port two will transmit all, or some predetermined fraction, of the light in channel n at wavelength $\lambda_n$ to a single mode fiber coupled thereto. Lastly, ports three and four will transmit light in channels which are at different wavelengths, and whatever residual light at $\lambda_n$ that was not coupled into port number two into single mode fibers coupled to ports three and four. In accordance with the present invention, all of the light in the other channels can be coupled to port three or to port four or in some predetermined ratio divided between ports three and four.

In particular, an embodiment of a first aspect of the present invention comprises a twin core fiber which is comprised of two, substantially identical, single mode fibers which form a coupling region wherein the diameters of the cores and the separation of the cores over an appropriate length are fabricated to provide substantially complete evanescent field coupling of light from one core to the other in a predetermined wavelength band (The length in which evanescent coupling occurs for identical cores and fixed core spacing such that light couples from one core completely to the other core and then back again to the original core will be referred to as a beat length and the beat length will be designated as $\Lambda_B$). The twin core fiber further comprises a Bragg grating in each of the cores in the coupling region. The Bragg gratings are substantially perpendicular to the axis of the twin core fiber or the two evanescently coupled fibers and the phases of the Bragg gratings in the two cores are substantially the same. The Bragg gratings in the two cores are in phase with each other if, for example, they are formed by first fusing or otherwise attaching the fibers with the cores to each other and then exposing the twin core fiber to ultraviolet activating light such that the high light intensity regions are substantially perpendicular to the axis of the fiber. Hereafter, when Bragg gratings are referred to in the two cores it is assumed that they are substantially in phase with each other.

In a preferred embodiment of the first aspect of the present invention, the length of the coupling region, i.e., the region of the twin core fiber wherein the two cores are separated by an appropriate distance for evanescent coupling, is substantially equal to $\Lambda_B/2$ and the Bragg grating is located substantially at the center of the coupling region, i.e., the center of the Bragg grating occurs at a distance substantially equal to $\Lambda_B/4$ from an end of the coupling region. Thus, embodiments of the first aspect of the present invention comprise a twin core, evanescent wave, coupler fiber having a Bragg grating disposed within a coupling region of a twin core region of the fiber. (Embodiments of the present invention will be referred to below as Bragg-Evanescent-Coupler devices or BEC devices). In preferred embodiments of the present invention, the fibers are fabricated having cores that are photorefractive, for example, by the addition of germania to silica in a silica clad fiber, to advantageously enable photo-fabrication of Bragg gratings.

Embodiments of further aspects of the present invention are fabricated by coupling BEC devices having substantially identical characteristics to provide enhanced selectivity or by coupling BEC devices having different characteristics to provide selective channel adding or dropping. Embodiments of still further aspects of the present invention are tunable BEC devices which utilize means for tuning the length of the evanescent coupling region and/or the characteristics of the Bragg grating. In preferred embodiments of these aspects of the present invention, such means for tuning comprise piezoelectric rings which are disposed about the BEC device or other means such as means for applying stress or temperature changes.

Advantageously, further embodiments of the present invention satisfy the above-identified second need in the art and provide a device for use in dispersion compensation of light signals at predetermined center wavelengths.

An embodiment of the present invention is a two port device for use in a transmission system. In particular, an embodiment of this aspect of the present invention comprises a twin core fiber which is comprised of two, substantially identical, single mode fibers which form a coupling region wherein the diameters of the cores and the separation of the cores over an appropriate length are fabricated to provide evanescent field coupling of substantially one half of the light from one core to the other in a predetermined wavelength band (The length in which evanescent coupling would occur for identical cores and fixed core spacing such that light couples from one core completely to the other core and then back again to the original core will be referred to as a beat length and the beat length will be designated as $\Lambda_B$). In accordance with the present invention, a chirped Bragg grating is located at a distance substantially equal to $\Lambda_B/4$ from an end of the coupling region. The chirped grating is disposed substantially perpendicular to the cores and substantially in phase across both cores. Advantageously, such an apparatus provides dispersion compensation without the 6 dB loss resulting from use of a 2 by 2, biconical, tapered coupler and chirped grating of the prior art.

Further embodiments of the present invention utilize the inventive BEC coupler to fabricate light amplifiers, laser oscillators, superluminescent devices, and transmission systems.

DETAILED DESCRIPTION

Figure 1:
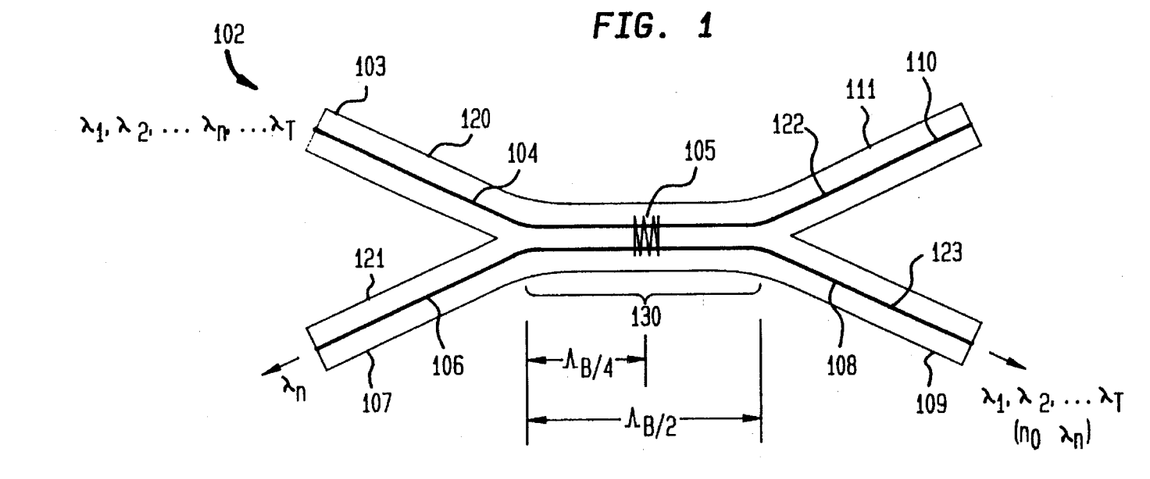
FIG. 1 shows, in pictorial form, a device fabricated in accordance with the present invention (a twin core, evanescent wave, coupler fiber having a Bragg grating disposed in the coupling region of the twin core fiber at a predetermined distance from an entrance end thereof) being used to drop a signal at wavelength $\lambda_n$ into a fiber optic transmission line.

FIG. 1 shows, in pictorial form, device 100 which is fabricated in accordance with the present invention. As shown in FIG. 1, device 100 comprises two substantially identical single mode fibers 120 and 121 having cores 122 and 123, respectively. The diameters of cores 122 and 123 and the separation of the cores in region 130 are fabricated in accordance with methods which are well known in the art so that there is substantially complete evanescent field coupling of light from one core to the other in a predetermined wavelength band (The length in which evanescent coupling occurs for identical cores and fixed core spacing such that light couples from one core completely to the other core and then back again to the original core will be referred to as a beat length and the beat length will be designated as $\Lambda_B$). The length of coupling region 130, i.e., the region of twin core fiber 100 wherein cores 120 and 121 are separated by the appropriate distance for evanescent coupling, is substantially equal to $\Lambda_B/2$. A discussion of evanescent coupling is set forth in a publication entitled "Guided normal modes of two parallel circular dielectric rods" by W. Wijngaard, published in *Journal of the Optical Society of America*, Vol. 63, No. 8, pp 944–950, Aug. 1973. Further, a discussion of twin core fiber, evanescent couplers and the fabrication thereof is also set forth in a publication entitled "Cross-talk fiber-optic temperature sensor" by G. Meltz, J. R. Dunphy, W. W. Morey, and E. Snitzer, published in *Applied Optics*, Vol. 22, pp. 464–477, Feb. 1, 1983.

As further shown in FIG. 1, twin core, evanescent wave, coupler fiber 100 comprises Bragg grating 105 which is disposed in each of cores 122 and 123 in coupling region 130 of twin core fiber 100 at a predetermined distance from an entrance end thereof. As still further shown in FIG. 1, Bragg grating 105 is located substantially at the center of coupling region 130, i.e., the center of Bragg grating 105 occurs at a distance substantially equal to $\Lambda_B/4$ from an end of coupling region 130 (Embodiments of the present invention will be referred to below as Bragg-Evanescent-Coupler devices or BEC devices). In a preferred embodiment of the present invention, the fibers are fabricated having cores that are photorefractive, for example, by the addition of germania to silica in a silica clad fiber. This enables one to fabricate a Bragg grating in the coupling region of the twin core fiber in accordance with a method disclosed in a publication entitled "Magnification of Mask Fabricated Fibre Bragg Gratings" by J. D. Prohaska, E. Snitzer, S. Rishton and V. Boegli, published in *Electronics Lett.*, Vol. 29, No. 18, pp. 1614–1615, Sep. 2, 1993. The Bragg gratings are substantially perpendicular to the axis of the twin core fiber or the two evanescently coupled fibers and the phases of the Bragg gratings in the two cores are substantially the same. The Bragg gratings in the two cores are in phase with each other if, for example, they are formed by first fusing or otherwise attaching the fibers with the cores to each other and then exposing the twin core fiber to ultraviolet activating light such that the high light intensity regions are substantially perpendicular to the axis of the fiber. Hereafter, when Bragg gratings are referred to in the two cores it is assumed that they are substantially in phase with each other.

BEC device 100 is utilized as follows. As shown in FIG. 1, a wavelength division multiplexed set of light signals at wavelengths in the regions of $\lambda_1, \lambda_2, \ldots, \lambda_n, \ldots \lambda_T$ is incident on port one, designated as port 103. A portion of core 122 which receives the input light signals is designated as core 104. Bragg grating 105, disposed at a distance of $\Lambda_B/4$ from an entrance end of evanescent coupler region 130, has a periodicity which causes it to reflect a narrow band of wavelengths in the region of $\lambda_n$. Methods of fabricating Bragg grating 105 having the desired periodicity are well known to those of ordinary skill in the art. Light having wavelengths in the region of $\lambda_n$ are reflected by Bragg grating 105 and, upon traveling back through the distance $\Lambda_B/4$ of coupler region 130, travel into a portion of core 123 designated as core 106 and emerge from port 2, designated as port 107. Advantageously, other wavelengths are not effected by Bragg grating 105 and, when the length of coupler region 130 is substantially equal to $\Lambda_B/2$, all such other wavelengths travel into a portion of core 123 designated as 108 and emerge from port three, designated as port 109.

If the length of coupler region 130 in FIG. 1 is fabricated to be substantially equal to $\Lambda_B$, but the distance from the entrance end of coupler region 130 to Bragg grating 105 is still substantially equal to $\Lambda_B/4$, then light at wavelengths in the region of $\lambda_n$ will still emerge from port two, i.e., port 107, but light at all of the other transmitted wavelengths will travel into a portion of core 122 designated as 110 and will emerge from port four, designated as port 111.

In general, whenever the length of evanescent coupler region 130 is substantially equal to whole multiples of beat length $\Lambda_B$, then transmitted output light will emerge from port four, designated as port 111. Whenever the length of evanescent coupler region 130 is substantially equal to odd multiples of $\Lambda_B/2$, then transmitted output light will emerge from port three, designated as port 109. Lastly, whenever the length of evanescent coupler region 130 is between even or odd multiples of $\Lambda_B/2$, the transmitted output light will be divided between output ports 109 and 111. In order to obtain all of the reflected light traveling in core 106 to port two, Bragg grating 105 must be positioned at a distance from the entrance end of coupler region 130 substantially equal to $[N(\Lambda_B/2)+\Lambda_B/4]$ where N is a positive integer or zero. For wavelengths which are substantially reflected by Bragg grating 105 but where the above-described positioning condition is not satisfied, reflected light will be divided between cores 104 and 106.

In a further embodiment of the present invention, Bragg grating 105 is a partial reflector. In such embodiments, the reflected light is subject to the above-described conditions and the transmitted light behaves in the manner that has been described above for the other transmitted light signals.

Figure 2:
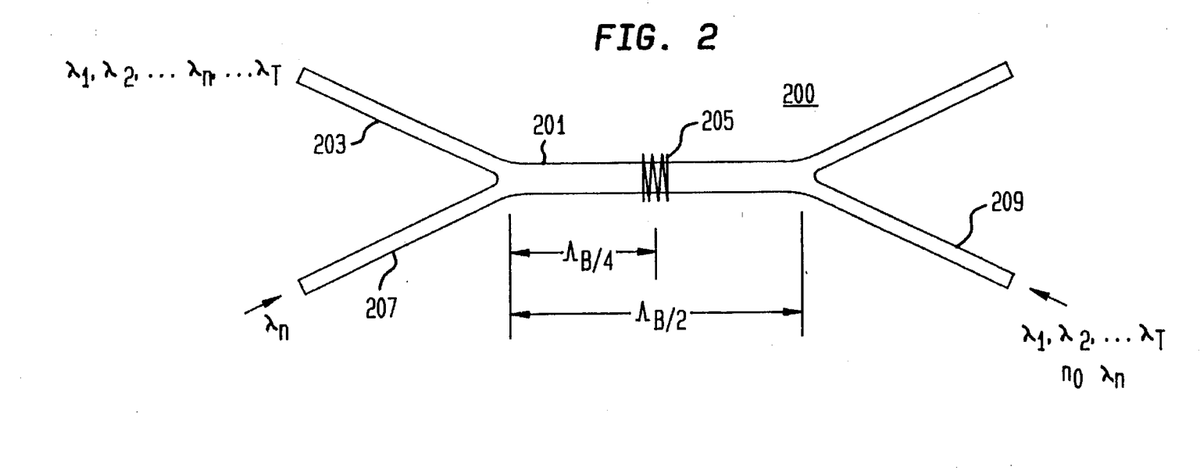
FIG. 2 shows, in pictorial form, the device of FIG. 1 being used to add a signal at wavelength $\lambda_n$ to a fiber optic transmission line.

FIG. 2 shows, in pictorial form, BEC device 200 which is fabricated in the same manner as device 100 of FIG. 1 is fabricated. As shown in FIG. 2, device 200 is used to add a light signal having wavelengths in the region of $\lambda_n$ to a fiber optic transmission line, i.e., BEC device 200 acts as a combiner or wavelength adding device (Although evanescent coupler region 201 and Bragg grating 205 are shown in FIG. 2, the cores of the fibers are not shown for ease of understanding). As further shown in FIG. 2, light signals having wavelengths in the regions of $\lambda_1, \lambda_2, \ldots, \lambda_T$ enter port 209 and a light signal having wavelengths in the region of $\lambda_n$ enters port 207. In accordance with the present invention, the combined light signal emerges from port 203.

Figure 3:
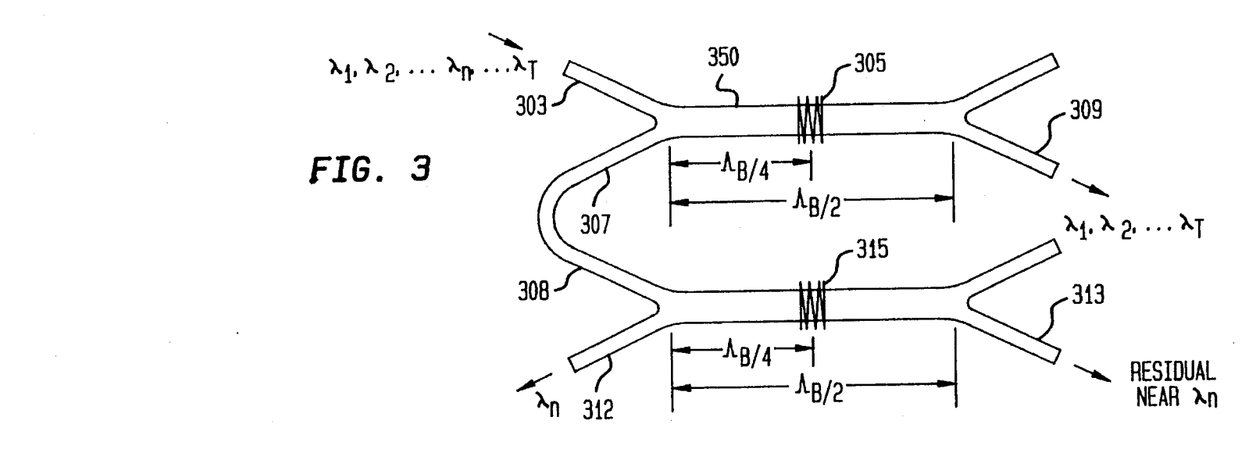
FIG. 3 shows, in pictorial form, a series connection of devices which are fabricated in accordance with the present invention being used to drop a signal at wavelength $\lambda_n$ into a fiber optic transmission line.

FIG. 3 shows, in pictorial form, an embodiment of the present invention comprised of substantially identical couplers, BEC device 350 and BEC device 351, which are cascaded series. The device shown in FIG. 3 is used to drop a light signal having wavelengths in the region of $\lambda_n$ into a fiber optic transmission line. As shown in FIG. 3, light signals having wavelengths in the regions of $\lambda_1, \lambda_2, \ldots, \lambda_n, \ldots \lambda_T$ enter port 303 of BEC device 350 and light having wavelengths in the region of $\lambda_n$ enters port 307 of BEC device 350. Then light having wavelengths in the region of $\lambda_n$ enters port 312 of BEC device 351 and residual light having wavelengths near $\lambda_n$ enters port 313 of BEC device 351. The embodiment shown in FIG. 3 advantageously multiplies the reflection characteristic provided to port 307 from Bragg grating 305 of BEC device 350 by the reflection characteristic of Bragg grating 315 of BEC device 351 in providing the final output from port 312 of BEC device 351.

Figure 4:
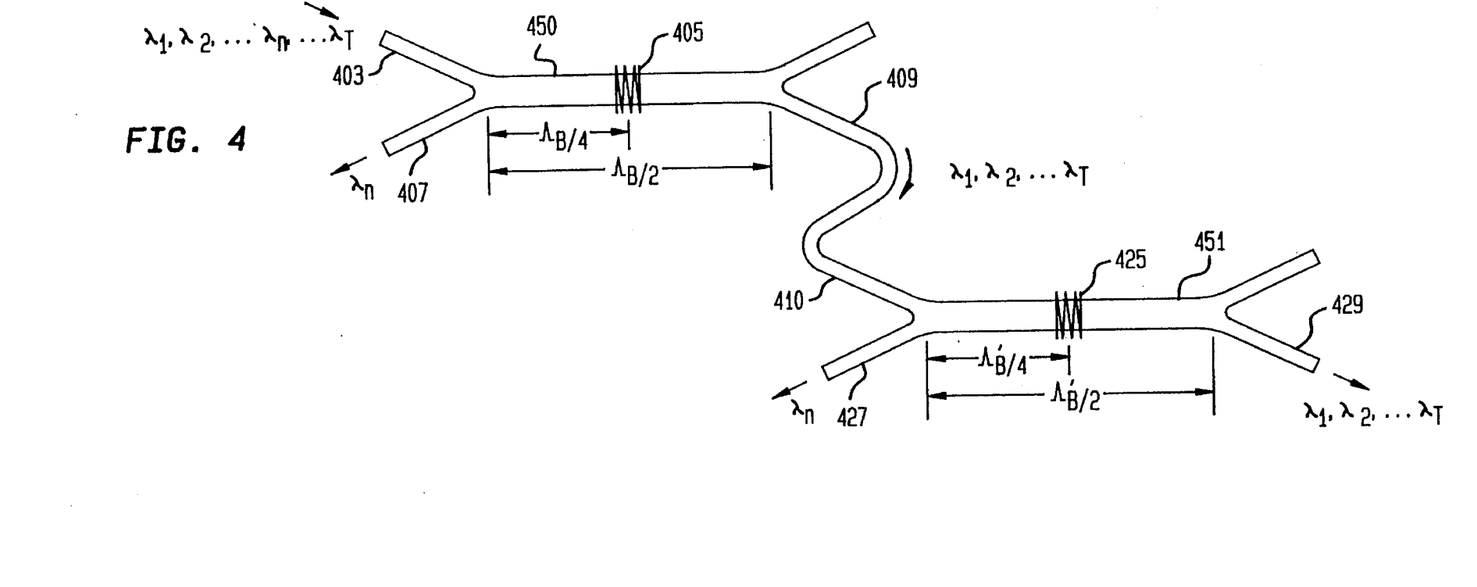
FIG. 4 shows, in pictorial form, a series connection of devices which are fabricated in accordance with the present invention being used to drop two signals at two different wavelengths $\lambda_n$ and $\lambda_m$ respectively, into different fiber optic transmission lines.

FIG. 4 shows, in pictorial form, an embodiment of the present invention comprised of different couplers, BEC device 450 and BEC device 451, which are cascaded in series. The device shown in FIG. 4 is used to drop a light signal having wavelengths in the region of $\lambda_n$ to a fiber optic transmission line and to drop a light signal having wavelengths in the region of $\lambda_m$ to another fiber optic transmission line. As shown in FIG. 4, light signals having wavelengths in the regions of $\lambda_1, \lambda_2, \ldots, \lambda_n, \lambda_m, \ldots, \lambda_T$ enter port 403 and light having wavelengths in the region of $\lambda_n$ enters port 407 of BEC device 450, i.e., Bragg grating 405 is fabricated to have a periodicity for coupling light having wavelengths in the region of $\lambda_n$ to port 407. As further shown in FIG. 4, the remaining light signals are transmitted from port 409 of BEC device 450 to port 410 of BEC device 451. Then, light having wavelengths in the region of $\lambda_m$ enters port 427 of BEC device 451, i.e., Bragg grating 425 is fabricated to have a periodicity for coupling light having wavelengths in the region of $\lambda_m$ to port 427. The remaining light signals at the remaining wavelengths $\lambda_1, \lambda_2, \ldots, \lambda_T$ are coupled out of BEC device 451 from port 429. As those in the art will readily appreciate, the present invention further includes embodiments comprised of inventive BEC devices which are connected in various reflection and series combinations of FIGS. 3 and 4.

Figure 5:
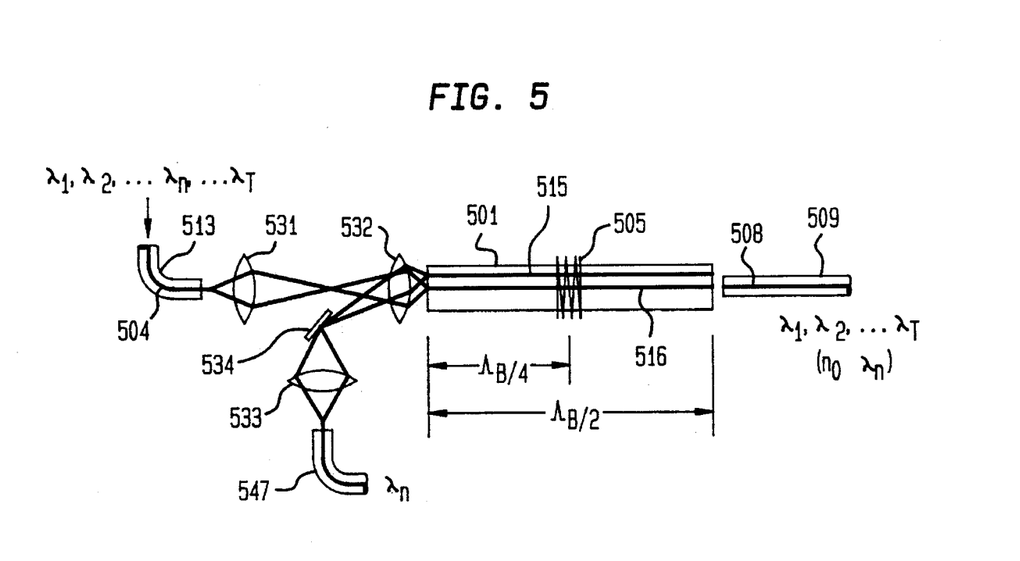
FIG. 5 shows, in pictorial form, an alternative embodiment of a device which is fabricated in accordance with the present invention.

FIG. 5 shows, in pictorial form, an embodiment of inventive BEC device 501 wherein light signals having wavelengths in the regions $\lambda_1, \lambda_2, \ldots, \lambda_n, \ldots, \lambda_T$ are coupled into BEC device 501 and a light signal having wavelengths in the region of $\lambda_n$ is coupled out of BEC device 501 utilizing lenses 531, 532, and 533 and reflector 534. As shown in FIG. 5, light signals having wavelengths in the regions $\lambda_1, \lambda_2, \ldots, \lambda_n, \ldots, \lambda_T$ are coupled from fiber 513 into BEC device 501 by lenses 531 and 532. A light signal having wavelengths in the region of $\lambda_n$ is coupled into fiber 547 by lens 532, reflector 534 and lens 533. Reflector 534 is disposed at the magnified image for lenses 531 and 532 and it is positioned so that it does not obstruct light transmitted between lenses 531 to 532. Lastly, as shown in FIG. 5, the input light signals are coupled to core 516 of BEC 501 and impinge upon Bragg grating 505. Bragg grating 505 is designed to reflect wavelengths in the region of $\lambda_n$. Then, reflected radiation having wavelengths in the region of $\lambda_n$ travels through core 515 towards lens 532 for coupling to fiber 547. Lastly, the remaining light signals in the input are coupled into fiber 509.

It is to be noted that embodiments of the present invention are not limited to BEC devices which are fabricated in a fiber configuration. In fact, it is within the scope of the present invention that BEC devices for use in adding or dropping selected wavelength light channels in wavelength division multiplex communications channels can be fabricated using light waveguides such as those fabricated in a planar, integrated, optic configuration by methods which are well known to those familiar with the art.

Figure 6:
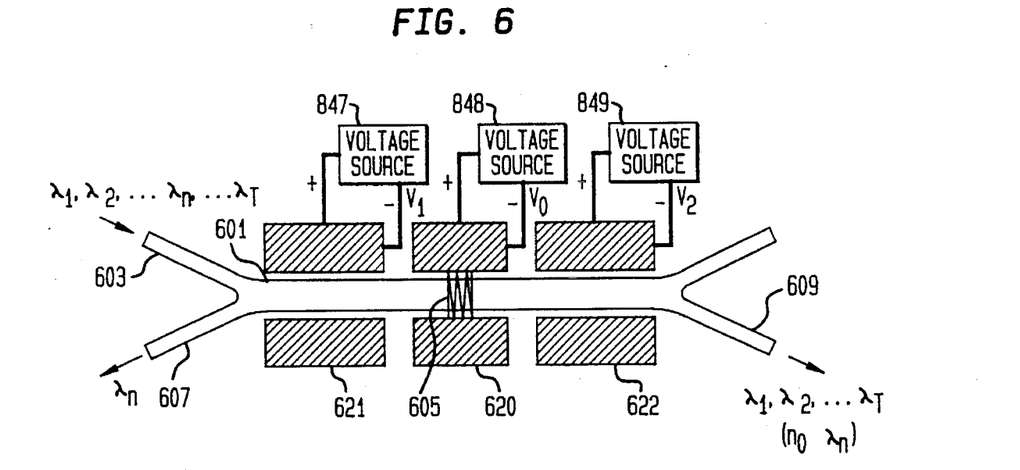
FIG. 6 shows, in pictorial form, a further alternative embodiment of a device which is fabricated in accordance with the present invention which comprises a twin core, evanescent wave, coupler fiber within which a Bragg grating is disposed, which fiber is surrounded by piezoelectric transducers that provide adjustment and tuning of the twin core fiber lengths and the wavelength at which the Bragg grating is reflecting.

Further embodiments of the present invention are tunable BEC devices which utilize means for tuning the length of the evanescent coupling region and/or the characteristics of the Bragg grating. In preferred embodiments of these aspects of the present invention, such means for tuning comprise piezoelectric rings which are disposed about the BEC device or other means such as means for applying stress or temperature changes. FIG. 6 shows, in pictorial form, BEC device 601 which is surrounded by piezoelectric rings 620, 621, and 622. Piezoelectric rings 620–622 operate in a manner which is well known to those in the art in response to voltages $V_0$, $V_1$, and $V_2$ which are applied thereto, respectively, to alter the length and cross section of portions of BEC device 601 which are contained therewithin.

Sources of the voltages and means for varying the voltages 847, 848, and 849 shown in FIG. 6 are well known to those in the art. In accordance with the present invention, piezoelectric ring 620 tunes BEC device 601 by changing the periodicity of Bragg grating 605 and, thereby, the wavelength of the reflected light. Similarly, piezoelectric rings 621 and 622 tune BEC device 601 by changing the evanescent portion of BEC device 601 without affecting the grating, i.e., ring 621 changes the length of BEC device 601 before Bragg grating 605 and ring 622 changes the length of BEC device 601 after Bragg grating 605.

Figure 7:
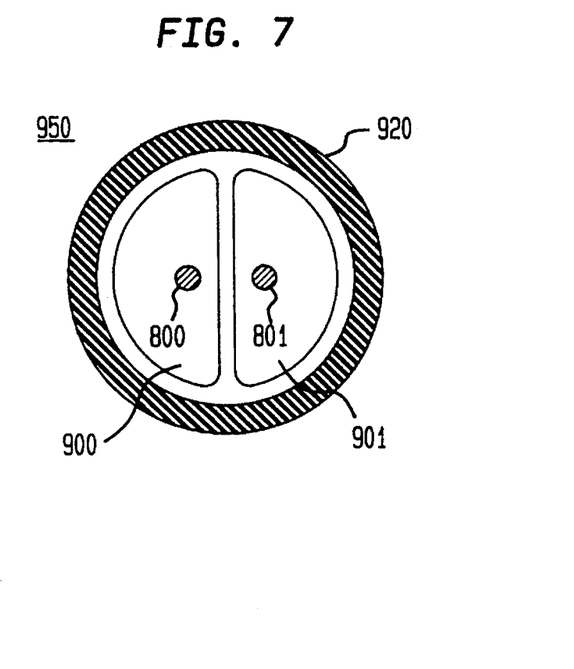
FIG. 7 shows, in pictorial form, a cross section of a preform which is fused and drawn down to appropriate size to form an inventive Bragg-Evanescent-Coupler device (BEC device)

Embodiments of the inventive BEC device can be fabricated as a single fiber having two substantially identical cores disposed therewithin. For example, FIG. 7 shows, in pictorial form, a cross section of a preform which is fused and drawn down to appropriate size to form a BEC device. As shown in FIG. 7, preform 950 is comprised of tube 920, "D" shaped claddings 900 and 901, and cores 800 and 801 disposed within claddings 900 and 901, respectively. Alternatively, embodiments of the present invention can be fabricated by bringing two, separate "D" shaped fibers into contact so that the evanescent fields of the cores interact with one another. For example, the interface between the fibers can be fused or can be contacted using a substance such as oil. In accordance with the present invention, one embodiment is formed by fusing the fibers over a finite length corresponding to, for example, $\Lambda_B/2$. In a preferred embodiment, the twin core region is drawn to a smaller diameter to provide better isolation of the cores in the input and output ports of the BEC coupler.

Figure 8:
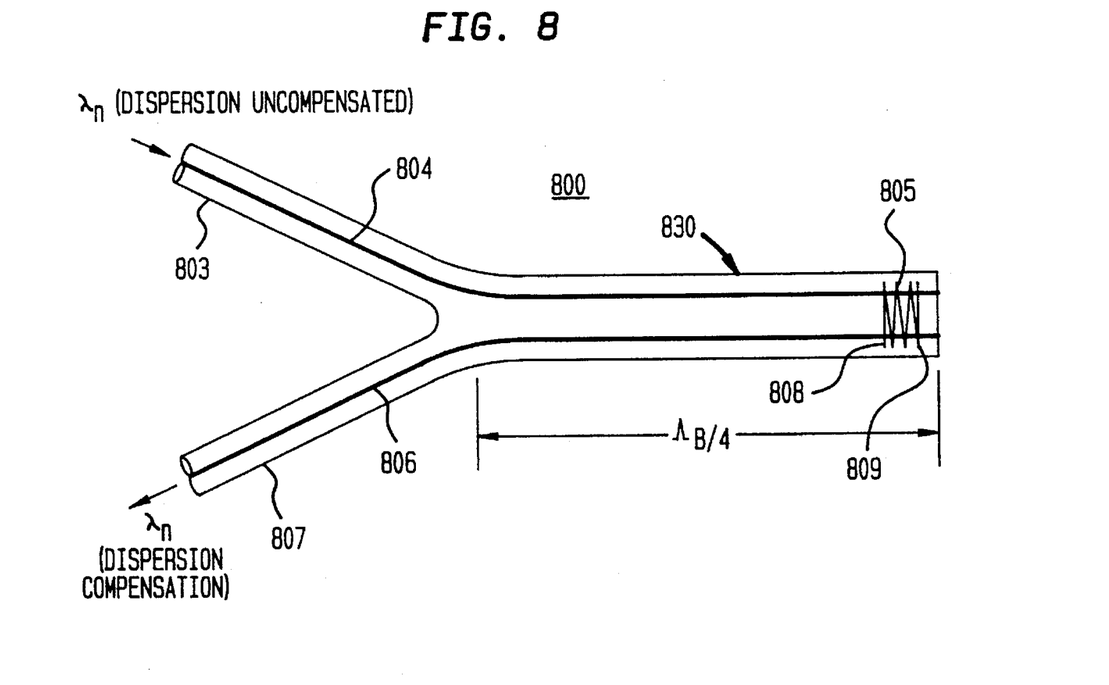
FIG. 8 shows, in pictorial form, a twin core, evanescent wave, coupler fiber having a chirped Bragg grating disposed in the coupling region of the twin core fiber at a predetermined distance from an entrance end thereof.

Embodiments of the present invention further comprise dispersion compensators. FIG. 8 shows, in pictorial form, twin core, evanescent wave, coupler fiber 800 which is fabricated in accordance with the present invention to provide low-loss dispersion compensation. As shown in FIG. 8, dispersion uncompensated light signals having wavelengths in the region of $\lambda_n$ enter port 803 of BEC device 800. In accordance with the present invention, Bragg grating 805 is fabricated to have a periodicity for coupling dispersion compensated light having wavelengths in the region of $\lambda_n$ to port 807. As further shown in FIG. 8, Bragg grating 805 is disposed substantially at a distance of $\Lambda_B/4$ from an entrance end of evanescent coupler region 830 and has a periodicity which causes it to reflect a narrow band of wavelengths in the region of $\lambda_n$ (of course, in further embodiments, the distance equals the distance plus an amount which is substantially equal to N multiplied by the half-beat-length, where N is a positive integer or zero). In accordance with the present invention, Bragg grating 805 is chirped to provide dispersion compensation. Further, chirped Bragg grating 805 is disposed substantially perpendicular to cores 804 and 806 and in phase across both cores. For use in connection with providing dispersion compensation for light signals in a wavelength region surrounding about 1.5 microns in silica cores, Bragg grating 805 would be chirped so that longer wavelengths are reflected at the entrance end of the grating and shorter wavelengths are reflected at the far end of Bragg grating 805. Specifically, with reference to FIG. 8, for use in connection with light signals in a wavelength region surrounding about 1.5 microns in silica cores, Bragg grating 805 is chirped so that longer wavelengths (relative to $\lambda_n$) are reflected from entrance end 808 of Bragg grating 805 and shorter wavelengths (relative to $\lambda_n$) are reflected from far end 809 of Bragg grating 805. Advantageously, the round trip distance from ends 808 and 809 is such as to compensate for the difference in arrival time of the extremes of the information bandwidth. As a result, light signals which are dispersion compensated substantially at $\lambda_n$ emerge from port 807 of BEC 805. Thus, in accordance with the present invention, chirped grating 805 provides different lengths for different wavelengths to compensate for the different arrival times associated with fiber dispersion. Methods of fabricating Bragg grating 805 having the desired periodicity and chirping are well known to those of ordinary skill in the art. By increasing the amount of the chirp, the dispersion compensator can provide compensation for two or more channels, with each channel at slightly different wavelengths.

As has been described above, a BEC coupler is a wavelength selective coupler in which light is coupled therein on one single mode waveguide and coupled out on an adjacent single mode waveguide, the waveguides being fabricated, for example, from single mode fibers. The following describes, in accordance with the present invention, uses of a BEC coupler in fabricating other devices, apparatus, and systems. For example, the following describes the use of a BEC coupler to fabricate fiber laser oscillators or light amplifiers in which the total path for light in an induced emission component comprises one or more single-core active sections connected by BEC coupler(s) in either fiber or in integrated optic forms.

Figure 9:
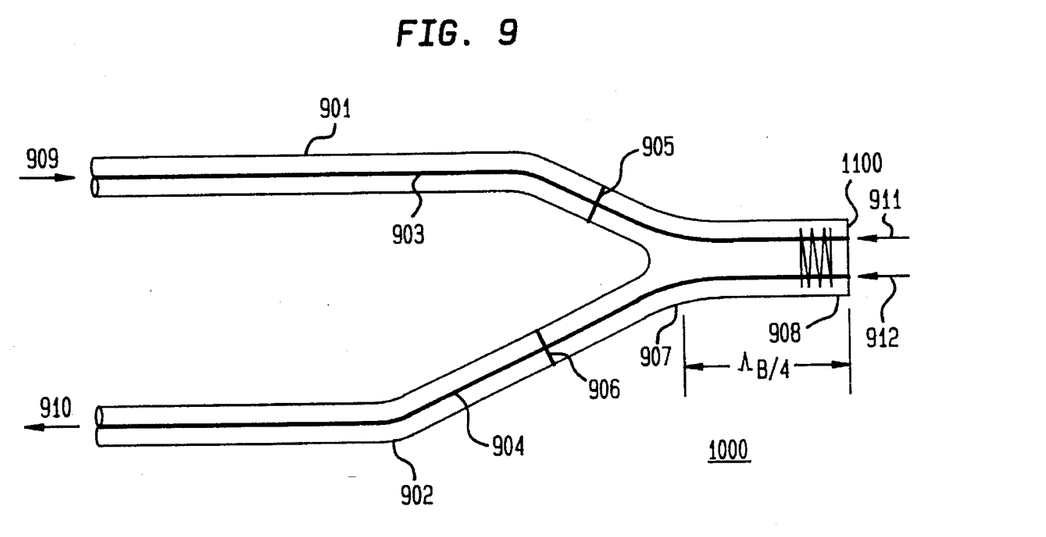
FIG. 9 shows, in pictorial form, an induced emission light amplifier which is fabricated in accordance with the present invention.

Embodiments of the present invention further comprise amplifiers. FIG. 9 shows, in pictorial form, induced emission light amplifier 1000 which is fabricated in accordance with the present invention. As shown in FIG. 9, light amplifier 1000 comprises two lengths of fiber, 901 and 902, having rare earth doped cores 903 and 904, respectively. Fibers 901 and 902 are connected at 905 and 906, respectively, by butt coupling, fusion splicing or by other means which are well known to those skilled in the art, to BEC coupler 907, or BEC coupler 907 may be formed by continuations of fibers 901 and 902. In accordance with the present invention, BEC coupler 907 is comprised of Bragg grating 908 which has a periodicity designed, to provide a desired reflection characteristic. In accordance with the present invention, the desired reflection characteristic may be relevant for a particular application and may be narrow band in wavelength, broad band in wavelength, or be broad band in wavelength and chirped (It is well known to those skilled in the art how to fabricate a Bragg grating providing the desired reflection characteristic). Bragg grating 908 is disposed substantially at a distance of $\Lambda_B/4$ from an entrance end of BEC coupler 907 (Of course, in further embodiments, the distance equals the distance plus an amount which is substantially equal to N multiplied by the half-beat-length, where N is a positive integer or zero). Light 909 is: (a) coupled into fiber 901 (by means which are well known in the art); (b) amplified by propagating through two lengths of active fiber, fibers 901 and 902, respectively, and (c) output from fiber 910 as amplified light signal 910. As further shown in FIG. 9, pump light 911 and 912 is coupled into the cores of BEC coupler 907 at open end 1100 of BEC coupler 907. In accordance with the present invention, the wavelength of pump light 911 and the wavelength of pump light 912 are displaced far enough in wavelength from the wavelengths which comprise input signal 909 so that Bragg reflector 908 is highly transparent to pump light 911 and 912 but is highly reflective to signal-light 909 and 910. Amplifier 1000 is advantageous in that it provides wavelength selectivity as a result of using Bragg grating reflector 908. Amplifier 1000 is further advantageous in that it does not require the use of a dispersive biconical tapered coupler for coupling signal light and pump light to active core fibers. This is advantageous because it reduces the cost and complexity of the amplifier-filter combination.

In accordance with the present invention, there are a number of useful variations of the device shown in FIG. 9. For example, one useful variation is produced when only core 903 is made active for example, by doping with a rare earth such as, for example, $Nd^{3+}$ or $Er^{3+}$, and pump light 911 is coupled only into active core 903. In such an embodiment, since pump light can be selected to be at short enough a wavelength to prevent any significant cross talk in the length $\Lambda_B/4$ for signal light 909 (BEC coupler 907 is fabricated to reflect light at the wavelengths in signal 909), substantially all of pump light 911 would be coupled to core 903. In such an embodiment, core 904 is fabricated as a passive material, or fiber 902 is removed so that output light 910 emerges from 906 without the presence of fiber 902.

In accordance with the present invention, output light 910 may be coupled (by methods which are well known in the art) into a Faraday isolator to prevent back reflected light from traveling back through amplifier 1000. It is preferred to provide a means for preventing back reflected light from traveling through amplifier 1000 because such back reflected light could cause a noisy amplified signal as well as decrease the efficiency of the amplifier.

Figure 10:
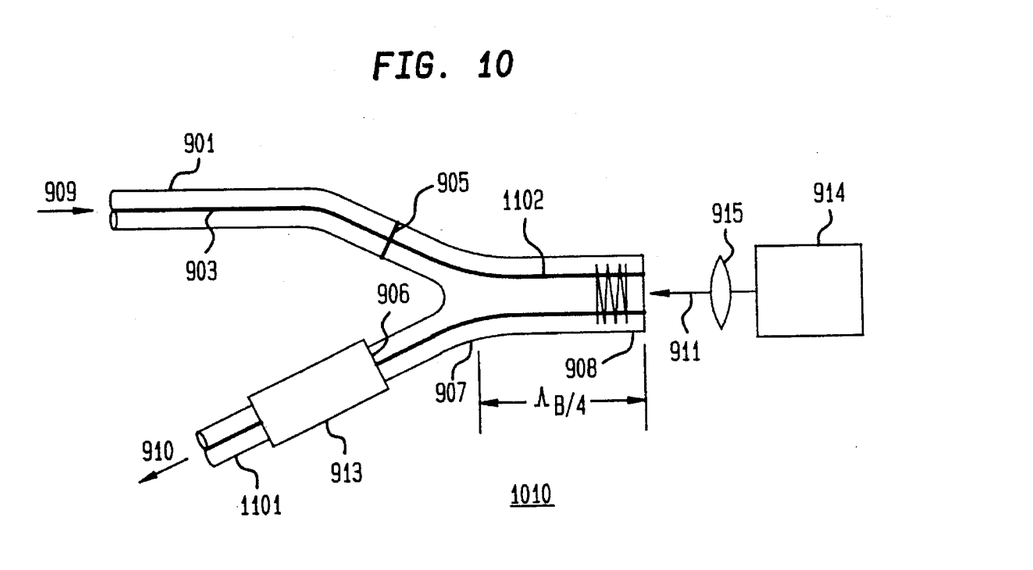
FIGS. 10–12 show, in pictorial form, alternative embodiments of an induced emission light amplifier which is fabricated in accordance with the present invention.

FIG. 10 shows, in pictorial form, amplifier 1010 which is fabricated in accordance with the present invention. Amplifier 1010 is a variation of amplifier 1000 shown in FIG. 9 wherein only fiber 903 is comprised of an active core and wherein one end of Faraday isolator 913 is connected to output 906 of BEC coupler 907 and the other end of Faraday isolator 913 is connected to transmission line 1101. Output from pump light source 914 is coupled by lens 915 (or by other means for coupling pump light 911 to a fiber) into core 1102 of BEC coupler 907 that couples pump light 911 to active core 903. Portions of amplifier 1010 shown in FIG. 10 but which have not been discussed here have the same functions and properties as were discussed above for similarly designated portions of amplifier 1000 shown in FIG. 9.

Figure 11:
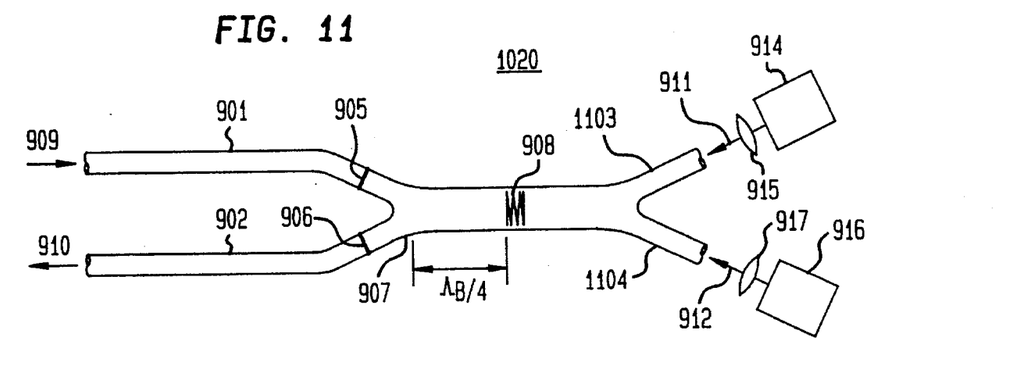
Figure 12:
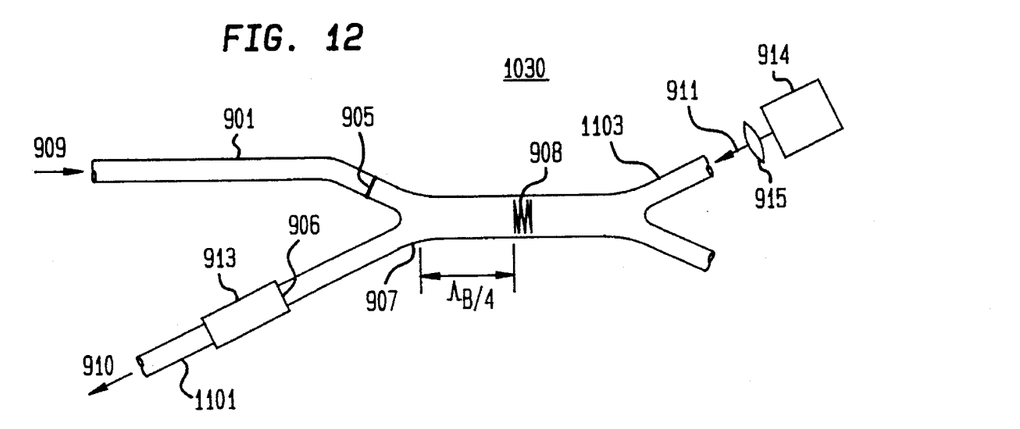

FIGS. 11 and 12 show, in pictorial, form, amplifiers 1020 and 1030 which are fabricated in accordance with the present invention. Amplifiers 1020 and 1030 are modifications of amplifiers 1000 and 1010 shown in FIGS. 9 and 10, respectively. Similar number designations in FIGS. 9 and 11 and in FIGS. 10 and,12, respectively, refer to portions of the embodiments having the same functions and properties as were discussed above with respect to FIGS. 9 and 10, respectively (the fiber cores are not shown in FIGS. 11 and 12 for ease of understanding the invention). Amplifier 1020 shown in FIG. 11 is a modification of amplifier 1000 shown in FIG. 9 in that it further comprises input ports 1103 and 1104 As shown in FIG. 11, pump light 911 is coupled into port 1103 (the core of fiber 1103) from pump light source 914 by focusing lens 915 and pump light 912 is coupled into port 1104 (the core of fiber 1104) from pump light source 916 by focusing lens 917. Amplifier 1030 shown in FIG. 12 is a modification of amplifier 1010 shown in FIG. 10 in that it further comprises input port 1103. As shown in FIG. 12, pump light 911 is coupled into port 1103 (the core of fiber 1103) from pump light source 914 by focusing lens 915, Faraday isolator 913 is coupled to BEC 907 at junction 906 so that output light 910 passes through the isolator and then into output transmission line 1101. Further variations of the amplifier 1020 shown in FIG. 11 may be fabricated wherein Faraday isolator 913 is coupled thereto at the end of amplifier 902.

Figure 13:
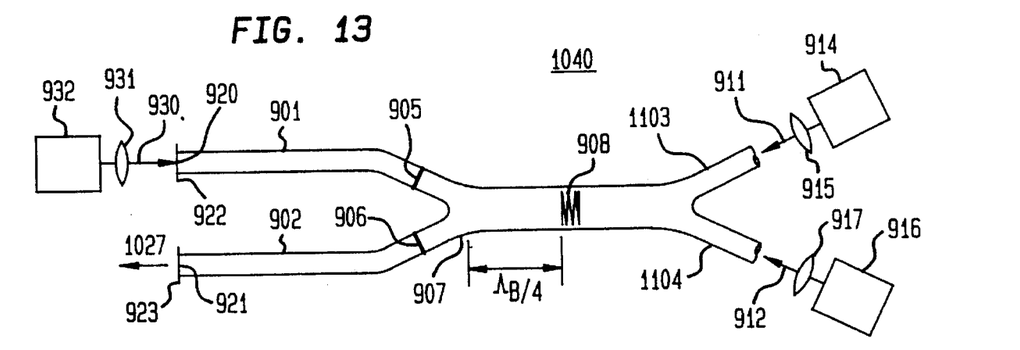
FIG. 13 shows, in pictorial form, a laser oscillator which is fabricated in accordance with the present invention.

Embodiments of the present invention further include laser oscillators. FIG. 13 shows, in pictorial form, laser oscillator 1040 which is fabricated in accordance with the present invention. ,Laser oscillator 1040 shown in FIG. 13 is fabricated by modifying amplifier 1020 shown in FIG. 11. This modification entails terminating ends 920 and 921 of fibers 901 and 902, respectively, with reflectors 922 and 923, respectively. Oscillator 1040 shown in FIG. 13 is comprised of three pump sources, i.e., pump sources 914 and 916 which are arranged in the same manner as the like-numbered pump sources are arranged in FIG. 11 and additional source 932 whose output (pump light 930) is coupled into the core of active fiber 901 by focusing means 931 (lens 931). Reflector 922 disposed at the end of fiber 901 should have a high reflectivity (preferably a reflectivity of ~99%) at the laser wavelength and should be substantially transparent, or nearly so, (preferably a reflectivity of <15%) at the pump wavelength. Reflector 923 disposed at the end of fiber 902 should have an intermediate value of reflectivity at the laser wavelength whose exact value is chosen to optimize laser output light 1027. Of course, although laser oscillator 1040 is shown in FIG. 13 as being pumped with radiation from three pump sources 911, 912, and 932, it should be appreciated that the present invention includes embodiments wherein laser oscillator 1040 is operated with only one or just two of the three pump sources (for example, laser pump sources) shown.

Embodiments of the present invention further include superluminescent light sources which are fabricated in accordance with the present invention in a number of ways. For example, a superluminescent light source may be fabricated from oscillator 1040 shown in FIG. 13 by replacing exit reflector 923 with an antireflection coating and/or finishing the end of fiber 902 so that the end surface thereof is not perpendicular to the axis of fiber 902 but is disposed at an angle (preferably an angle of about 70 degrees). This arrangement will assure substantially zero reflection of light back into fiber 902.

It is noted that amplifiers 1000, 1010, 1020, and 1030 shown in FIGS. 9 through 12, respectively, are particularly useful in connection with a fiber fabricated for a double clad pumping scheme. As is well known in the art, in a double clad fiber, a single mode core doped with an active material (for example, a rare earth doped core) of index of refraction $n_1$ is surrounded by a first cladding of lower index $n_2$ and the first cladding is surrounded, in turn, by a second cladding of still lower refractive index $n_3$. As is well known in the art, in use, pump light is coupled into the first cladding and, as the pump light propagates down the fiber, it is absorbed by the active dopant (for example, an active rare earth dopant) in the core. To provide for efficient absorption of the pump light per unit length of the fiber, it is preferable that the core be offset from the geometric center of the first cladding (if the first cladding is circular or substantially circular in cross section) or that the shape of the cross section of the first cladding be non-circular (examples of appropriate shapes of the cross section are rectangular, elliptical or hemispherical). The advantage of the use of amplifier fabricated utilizing a BEC coupler with a double clad fiber derives from the fact that the input and exit ports of the amplifier can both be different from a port through which the pump light is admitted (this was described above with respect to amplifiers 1000, 1010, 1020, and 1030 shown in FIGS. 9–12, respectively).

Figure 14:
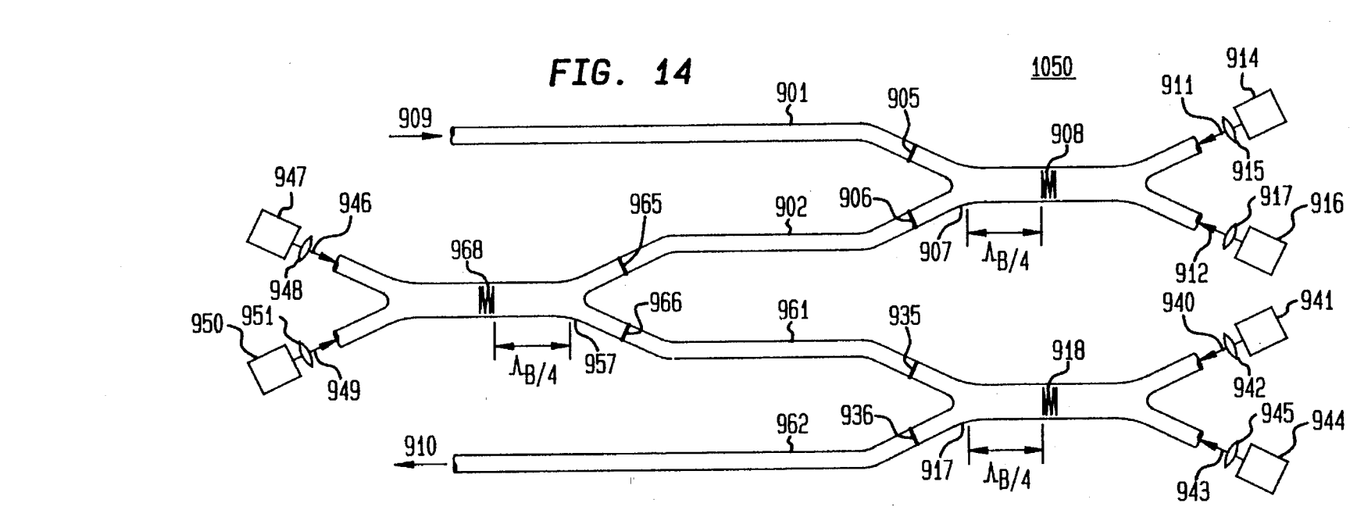
FIG. 14 shows, in pictorial form, an amplifier comprised of several active sections and two BEC couplers which is fabricated in accordance with the present invention.

Amplifiers 1000–1030 and oscillator 1040 shown in FIGS. 9–13 are shown as having been fabricated utilizing only single BEC coupler 907. However, it should be appreciated that the present invention includes amplifiers and oscillators which are fabricated having multiple active core sections which are connected in series with BEC couplers wherein pump light is coupled in at some or. all of the BEC couplers. FIG. 14 shows, in pictorial form, amplifier 1050 comprised of four active sections 901, 902, 961, and 962 and three BEC couplers 907, 967, and 977. As shown in FIG. 14, signal 909 is input to amplifier 1050 and signal 910 is amplified output. As further shown in FIG. 14, active core sections 901, 902, 961, and 962 are pumped by light beams 911, 912, 940, 943, 946, and 949 which are coupled by coupling means (lenses 915, 917, 942, 945, 948, and 951) from pump sources 914, 916, 941, 944, 947, and 950, respectively.

It should be understood that the Bragg grating in the BEC couplers shown in FIGS. 9–14 are shown to be disposed substantially at a distance of $\Lambda_B/4$ from an entrance end of the BEC couplers. However, further embodiments may be fabricated wherein the distance equals the distance plus an amount which is substantially equal to N multiplied by the half-beat-length, where N is a positive integer or zero.

Figure 15:
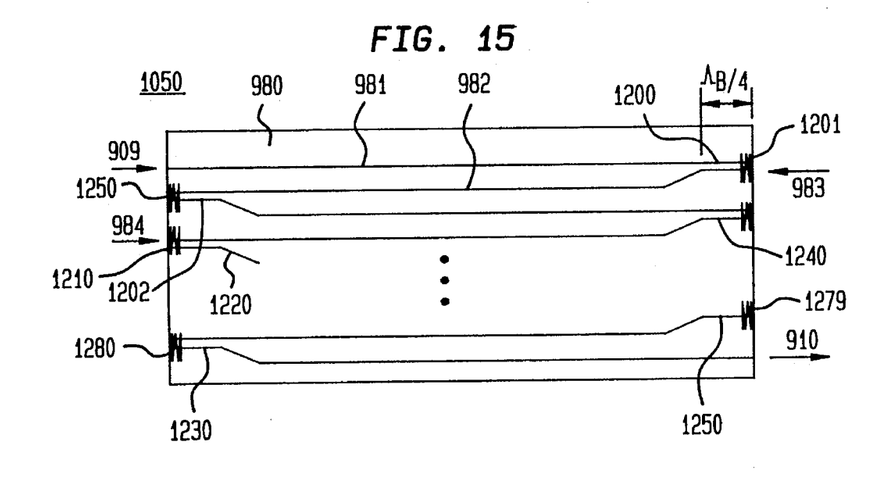
FIGS. 15 and 16 Show, in pictorial form, top and Cross sectional views, respectively, of an amplifier which has been fabricated in a planar configuration in accordance with the present invention.

It should be understood that the present invention includes embodiments which are fabricated utilizing waveguides other than fiber waveguides. For example, a planar configuration may be fabricated wherein many parallel rare earth doped light amplifying sections are connected by evanescent couplers at the ends. Such an embodiment is advantageous in that it effectively uses the area of the supporting substrate without the need for bends which sometimes occurs in embodiments utilizing fiber, which bends produce light loss. FIG. 15 shows, in pictorial form, a top view of amplifier 1050 which is fabricated in accordance with the present invention. As shown in FIG. 15, amplifier 1050 is disposed on substrate 980 which is fabricated, for example, from $SiO_2$. Signal light 909 enters waveguide 981 (core 981) which is separated from second waveguide 982 (core 982) over most of their length by a distance large enough to avoid any significant cross talk. At the far end of the path of waveguide 981, it and waveguide 982 are brought close enough together over the required distance to make the length be one fourth of the beat length for evanescent cross talk between twin core fibers. For example, in one embodiment of the present invention, waveguides 981 and 982 are fabricated from $GeO_2$ doped $SiO_2$ having a cross section of about 4 microns by 4 microns wherein waveguides 981 and 982 are spaced apart by about 4 microns in the region of BEC coupler 1200. In this embodiment, length $\Lambda_B/4$ from the entrance of BEC coupler 1200 to Bragg grating 1201 is approximately equal to 1 cm; the length of the uncoupled gain regions of waveguides 981 and 982 is approximately 13 cm; and the separation between waveguides 981 and 982 is approximately 26 microns. For a substrate having planar dimensions of approximately 15 cm×5 cm, there would be a total length of waveguide of approximately 15 cm×5 cm/$(30\times10^{-4})$ or 250 meters. This is more than enough length to obtain significant gain from a lightly doped erbium light amplifier with 100 to 500 parts per million by weight of trivalent erbium. Pump light could be coupled in together with signal 909 or pumping could be provided by coupling pump light 983 and 984 through BEC couplers 1201 and 1202, respectively. The present invention includes embodiments like that shown in FIG. 15 wherein one or more of the BEC couplers (such as, for example, BEC couplers 1200, 1210, 1220, 1230, 1240, . . . , 1250) have their Bragg gratings replaced by dichroic reflectors over the ends of the substrate.

Figure 16:
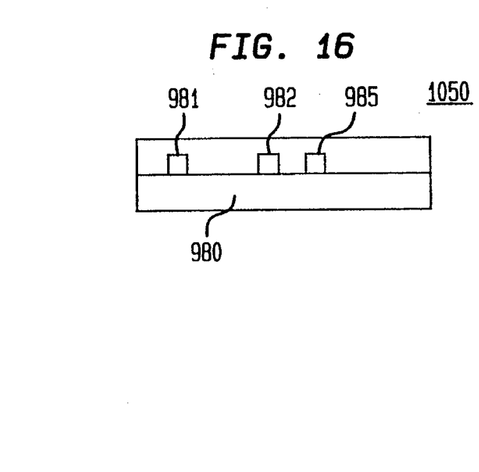

FIG. 16 shows a cross sectional view of the entrance of amplifier 1050 shown in FIG. 15. As shown in FIG. 16, waveguides 981 and 982 have cross sectional dimensions of approximately 4 microns by 4 microns and a space between them of about 26 microns, as viewed from the left end of the diagram shown in FIG. 16. To protect core-cladding interfaces of the waveguides, $SiO_2$ overlay 985 is applied to substrate 980. Methods for fabricating the substrate, waveguides, and overlay for amplifier 1050 are well known to those skilled in the art.

It should be understood that the Bragg grating in the BEC couplers shown in FIG. 15 are shown to be disposed substantially at a distance of $\Lambda_B/4$ from an entrance end of the BEC couplers. However, further embodiments may be fabricated wherein the distance equals the distance plus an amount which is substantially equal to N multiplied by the half-beat-length, where N is a positive integer or zero.

Figure 17:
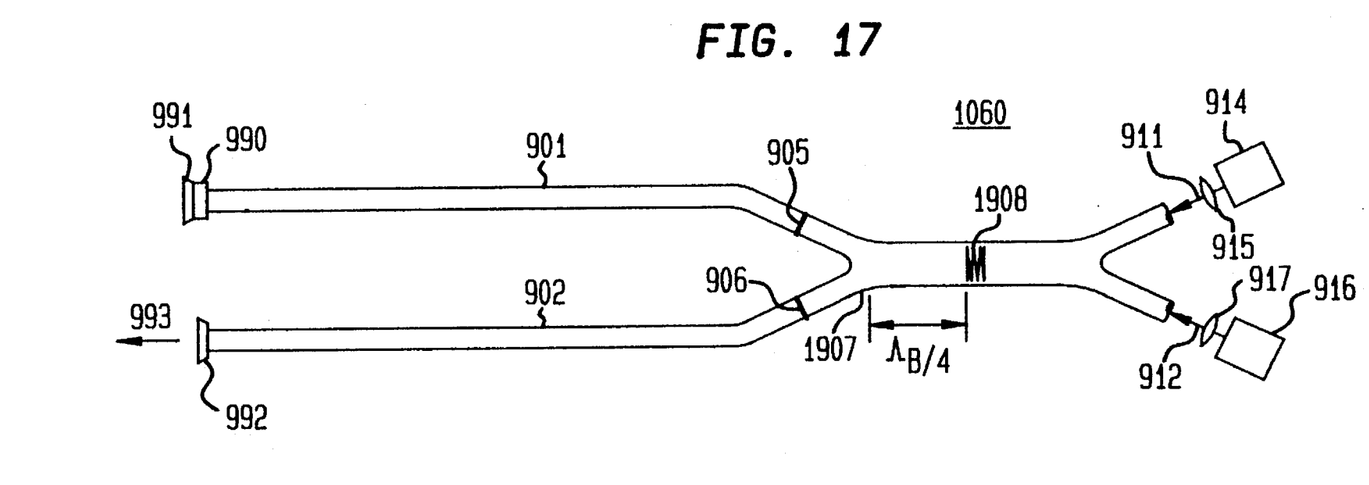
FIG. 17 shows, in pictorial form, a mode locked laser oscillator which is fabricated in accordance with the present invention.

Embodiments of the present invention further include mode locked oscillators. FIG. 17 shows, in pictorial form, mode locked laser oscillator 1060 which is fabricated in accordance with the present invention. As shown in FIG. 17, mode locked oscillator 1060 comprises two substantially equal lengths of amplifying fiber 901 and 902 (doped with an active material such as, for example, neodymium or erbium). Fibers 901 and 902 are connected at 905 and 906, respectively, by butt coupling, fusion splicing or by other means which are well known to those skilled in the art, to BEC coupler 1907. BEC coupler 1907 is comprised of chirped Bragg grating 1908. Chirped Bragg grating 1908 is disposed substantially at a distance of $\Lambda_B/4$ from an entrance end of BEC coupler 1907 (Of course, in further embodiments, the distance equals the distance plus an amount which is substantially equal to N multiplied by the half-beat-length, where N is a positive integer or zero). Pump light 911 and 912 output from optical pump sources 914 and 916, respectively, is coupled by coupling means 915 and 917 (for example, lenses), respectively, into the cores (not shown) which comprise BEC coupler 1908. In this embodiment, mode locking is provided by saturable absorber 990 which is disposed between the end of fiber 901 and its end reflector 991. The reflectivity of reflector 991 is very high (preferably the reflectivity of reflector 991 is substantially 100%). Exit reflector 992 has a lower value of reflectivity, typically the reflectivity of reflector 992 is in a range of about 50% to about 70%. Bragg grating 1908 is chirped in accordance with methods which are well known to those skilled in the art by an amount required to compensate for wavelength dispersion at the laser wavelength for a length equal to two passes through one of the amplifying sections (fiber 901 or fiber 902). Advantageously, this embodiment of the present invention enables the entire wavelength dependent gain curve of the active material to be utilized. As a result, this will provide a short duration mode locked pulse because the widest possible wavelength interval is made to contribute to the mode locked pulse. This embodiment contrasts with what is commonly done at present with, for example, neodymium mode locked lasers. In such lasers a wavelength selective element is incorporated into the cavity to limit the gain region to 1 to 2 nm of bandwidth. The reason for limiting the gain region is that material dispersion prevents a wider bandwidth from contributing to the mode locked pulse. The light in the cavity outside this wavelength interval tends to broaden the pulse duration and depletes the population inversion, both of which are detrimental effects. Amplifier 1060 shown in FIG. 17 eliminates these problems and provides a shorter pulse without any limitation on the length of the gain sections. The use of a long length (several tens of meters or more) makes it possible to use synchronous pumping to provide mode locking. A saturable absorber is not used in synchronous pumping, instead, pump pulses are coupled into a cavity to propagate in synchronization along with the mode locked pulses, i.e., pump light is input in the form of pulses whose separation in time is equal to the round trip time of a mode locked pulse in the cavity. Self starting of the buildup of the mode locked pulses assures synchronization of propagation of pump and mode locked pulses together down the fiber.

Figure 18:
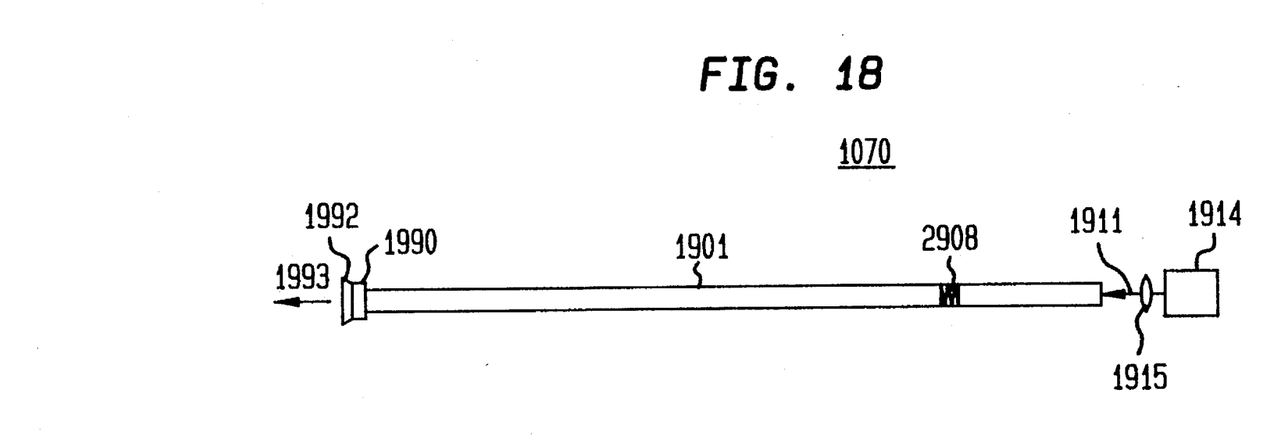
FIG. 18 shows, in pictorial form, an alternative embodiment of a mode locked oscillator which is shows, in pictorial form, mode locked laser oscillator which is fabricated in accordance with the present invention.

In FIG. 17, saturable absorption, output, and pumping are performed on different ports of mode locked oscillator 1060. However, the scope of the present invention includes embodiments wherein output and saturable absorption can be combined in the same port. FIG. 18 shows, in pictorial form, mode locked oscillator 1070 wherein saturable absorption and output are combined in the same port. As shown in FIG. 18, one end of active core region of fiber 1901 is terminated by saturable absorber 1990 and exit reflector 1992 for output light 1993. Chirped Bragg grating 2908 is disposed at or near the other end of the active core region of fiber 1901. Pump light 1911 output from pump source 1914 is coupled into fiber 1901 by coupling means 1915 (lens 1915). Chirped Bragg grating 2908 is fabricated to have a chirp which compensates for wavelength dispersion at the laser wavelength for a fiber length equal to twice the distance between saturable absorber 1990 and grating 2908. A configuration such as shown in FIG. 18 can also be made with pumping using a double clad fiber.

Figure 19:
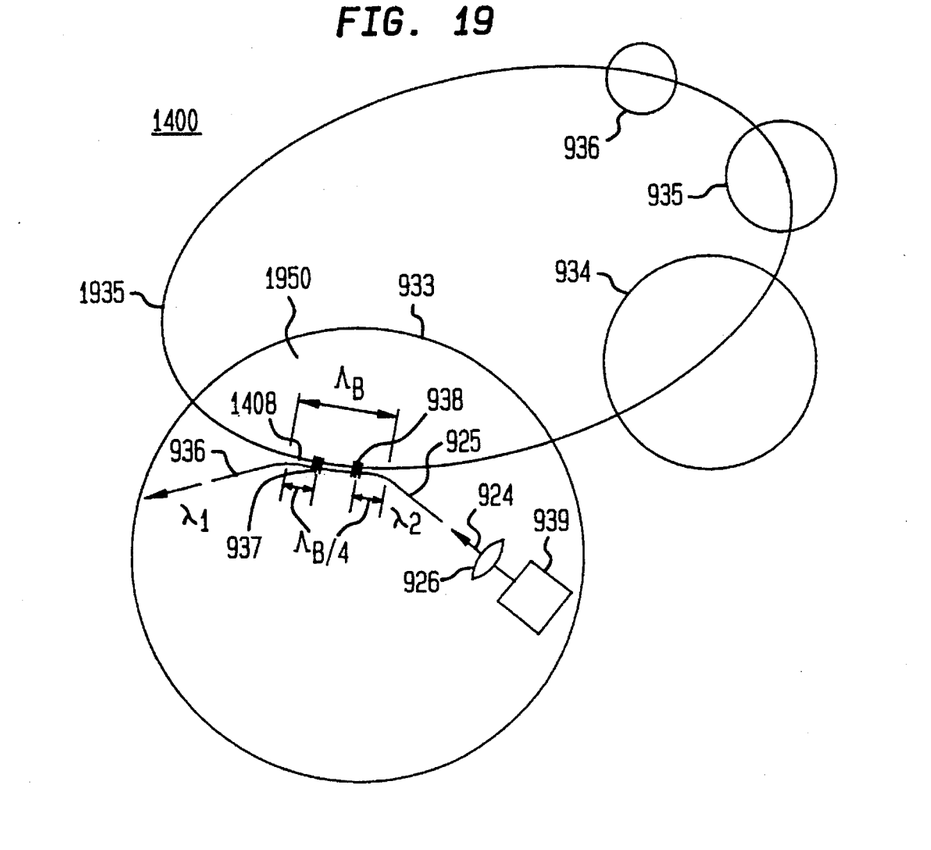
FIG. 19 shows, in pictorial form, a ring communications system which is fabricated in accordance with the present invention.

Embodiments of the present invention further include communications systems. FIG. 19 shows, in pictorial form, ring communications system 1400 which is fabricated in accordance with the present invention. As shown in FIG. 19, ring communications system 1400 is comprised of stations 933, 934, 935, 936, and so forth. As shown in FIG. 19, station 933 comprises BEC coupler 1950. BEC coupler 1950 has a length of $\Lambda_B$. BEC coupler 1950 is comprised of Bragg grating 937 which is disposed at a distance of $\Lambda_B/4$ from a first end of BEC coupler 1950 and Bragg grating 938 which is disposed at a distance of $\Lambda_B/4$ from a second end of BEC coupler 1950. Bragg grating 937 is tuned by means previously described above (not shown in FIG. 19 for ease of understanding the present invention) to reflect wavelengths substantially at receive wavelength $\lambda_1$ at station 933 of communications system 1400. As a result, communications signals transmitted over fiber 1935 are coupled out of second port 936 of BEC coupler 1408 by Bragg grating 937. The signal at wavelength $\lambda_1$ is then coupled by a lens or by other means to a detector (both the coupling and detecting means are not shown for ease of understanding the present invention).

Bragg grating 938 can be tuned by means previously described above (not shown in FIG. 19 for ease of understanding the present invention) to a wavelength $\lambda_2$ which is the reception wavelength for another station in system 1400 with which station 933 wishes to communicate. Input signal 924 at $\lambda_2$ is modulated and generated by modulated source 939 and coupled into third port 925 of BEC coupler 1408 by lens 926. Before station 933 transmits a message at wavelength $\lambda_2$ to another station, it may tune Bragg grating 937 to receive wavelength $\lambda_2$ to determine whether a receiver normally assigned to wavelength $\lambda_2$ is not in use. If the line is open, i.e., no other station is transmitting at wavelength $\lambda_2$, Bragg grating 938 is tuned to wavelength $\lambda_2$ and radiation coupled into Bragg grating 938 from source 939 is transmitted onto ring 1935. In a preferred embodiment, when a station is receiving a light signal from another station not all of the transmitted light is coupled out at the receiving station. The residual light on communications ring 1935 allows a third station, other than transmitter or receiver, to monitor the line. This is done to determine whether the line is open for communications between the third station and one of the other two stations to avoid message collisions.

Figure 20:
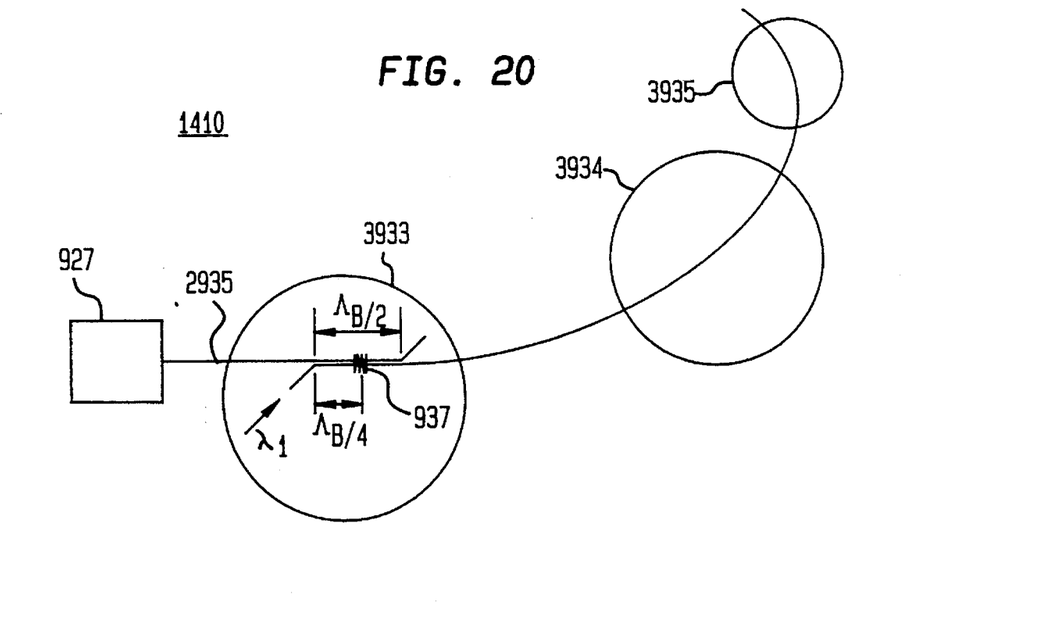
FIG. 20 shows a further communications system which is fabricated in accordance with the present invention.

FIG. 20 shows, in pictorial form, communications system 1410 which is fabricated in accordance with the present invention. As shown in FIG. 20, stations 3933, 3934, 3935, or others on communications line 2935 can transmit to a station, say station 3934 at wavelength $\lambda_1$, from central receiving station 927. For example, a message sent from station 3933 to central receiving station 927 contains a coded message which indicates the station to which the message is to be sent. Then, at central receiving station 927, the message is modulated onto the wavelength, for example, $\lambda_2$, that is assigned to station 3934 and sent to it. Means for receiving and sending signals at station 3933 have been discussed above and are not shown in FIG. 20 for ease of understanding the present invention. Central receiving station 927 can determine if a station is already in use by monitoring the wavelength assigned to it and it can communicate this fact back to the station seeking to converse with the in-use state. FIG. 20 also represents an embodiment of a multiplex sensor system in which each of the stations, 3933, 3934, 3935, and so forth is equipped to transmit its own preassigned fixed wavelength $\lambda_n$. In this embodiment, central receiving station 927 determines the source of information sent to it by the wavelength of its received signal. Various types of transducers, well known to those familiar with the art can convert the information at a station to modulation of the signal from that station.

It should be understood that the Bragg grating in the BEC couplers shown in FIGS. 19–20 are shown to be disposed substantially at a distance of $\Lambda_B/4$ from an entrance end of the BEC couplers. However, further embodiments may be fabricated wherein the distance equals the distance plus an amount which is substantially equal to N multiplied by the half-beat-length, where N is a positive integer or zero.

In accordance with the present invention, amplifiers, oscillators, and superluminescent devices which are similar to those shown in FIGS. 9, 10 and 15–16 can be fabricated wherein one or more of the Bragg gratings shown in these figures, for example, Bragg grating 908 of FIGS. 9 and 10, is replaced by a dichroic reflector. In accordance with the present invention, the dichroic reflectors used would still be disposed at a distance substantially equal to $\Lambda_B/4$ from the entrance edge of the evanescent field coupler or the distance plus an amount which is substantially equal to N multiplied by the half-beat-length, where N is a positive integer or zero.

Those skilled in the art will recognize that the foregoing description has been presented for the sake of illustration and description only. As such, it is not intended to be exhaustive or to limit the invention to the precise form disclosed. Thus, modifications and variations are possible in light of the above teaching which are considered to be within the spirit of the present invention. For example, inventive BEC devices may be fabricated which are comprised of single mode fibers which are not substantially identical. Therefore, it is to be understood that the claims appended hereto are intended to cover all such modification and variations which fall within the true scope and spirit of the invention.

What is claimed is:

1. A communications system which comprises:
  an optical fiber transmission ring, the ring being comprised of a substantially single mode waveguide;
  one or more stations coupled to the optical fiber transmission ring, a station comprising:
  an evanescent wave coupler having a coupling region formed from two substantially single mode waveguides, wherein size and spacing of the waveguides in the coupling region are fabricated having dimensions determined by a condition that if the coupling region were sufficiently long, substantially complete evanescent field coupling of light from one waveguide to the other in a predetermined wavelength band would occur, the coupler having a length substantially equal to twice a length for complete evanescent field coupling of light from one waveguide to the other in a predetermined wavelength band to occur (which length is referred to as a half-beat-length) plus an amount which is substantially equal to N multiplied by the half-beat-length, where N is an even positive integer or zero;

a first tunable Bragg grating disposed in the coupling region in each of the waveguides, wherein the Bragg gratings are positioned at a distance from an entrance end of the coupler region which is substantially equal to one-half of the half-beat-length plus an amount which is substantially equal to N1 multiplied by the half-beat-length, where N1 is a positive integer or zero; and a second tunable Bragg grating disposed in the coupling region in each of the waveguides, wherein the Bragg gratings are positioned at a distance from an end opposite the entrance end of the coupler region which is substantially equal to one-half of the half-beat-length plus an amount which is substantially equal to N2 multiplied by the half-beat-length, where N2 is a positive integer or zero.

2. The communications system of claim 1 which further comprises:

means for tuning the first Bragg gratings to be reflective to light in a first region at a first wavelength; and means for tuning the second Bragg gratings to be reflective to light in a second region at a second wavelength.

3. The communications system of claim 2 which further comprises:

means for coupling and detecting radiation output from the coupler in the first region; and means for generating and coupling radiation in the second region into the coupler.

4. A communications system which comprises:

an optical fiber transmission path, the path being comprised of a substantially single mode waveguide;

a receiving station for detecting signals transmitted over the path in one or more predetermined regions of wavelength and for transmitting signals over the path in one or more of the one or more predetermined regions of wavelength;

one or more stations coupled to the optical fiber transmission path, a station comprising:

an evanescent wave coupler having a coupling region formed from two substantially single mode waveguides, wherein size and spacing of the waveguides in the coupling region are fabricated having dimensions determined by a condition that if the coupling region were sufficiently long, substantially complete evanescent field coupling of light from one waveguide to the other in a predetermined one of the one or more regions; and a Bragg grating disposed in the coupling region in each of the waveguides, wherein the Bragg gratings are positioned at a distance from an entrance end of the coupler region which is substantially equal to one-half of a length for complete evanescent field coupling of light from one waveguide to the other in the predetermined one of the one or more regions to occur (which length is referred to as a half-beat-length) plus an amount which is substantially equal to N multiplied by the half-beat-length, where N is a positive integer or zero, the Bragg gratings being reflective to light in the predetermined one of the one or more regions.

* * * * *